United States Patent
Lee et al.

(10) Patent No.: US 8,959,225 B2
(45) Date of Patent: Feb. 17, 2015

(54) COOPERATIVE CACHING METHOD AND CONTENTS PROVIDING METHOD USING REQUEST APPORTIONING DEVICE

(75) Inventors: Ho-Kyoung Lee, Bucheon-si (KR); Jae Man Jang, Incheon (KR)

(73) Assignee: Aim To G Co., Ltd., Seoul (KR)

( * ) Notice: Subject to any disclaimer, the term of this patent is extended or adjusted under 35 U.S.C. 154(b) by 473 days.

(21) Appl. No.: 13/381,065

(22) PCT Filed: Jul. 1, 2010

(86) PCT No.: PCT/KR2010/004285
§ 371 (c)(1),
(2), (4) Date: Dec. 27, 2011

(87) PCT Pub. No.: WO2011/002245
PCT Pub. Date: Jun. 1, 2011

(65) Prior Publication Data
US 2012/0110113 A1 May 3, 2012

(30) Foreign Application Priority Data

Jul. 2, 2009 (KR) .................. 10-2009-0060368
Jun. 30, 2010 (KR) .................. 10-2010-0062841

(51) Int. Cl.
*G06F 15/173* (2006.01)
*H04L 29/08* (2006.01)
(52) U.S. Cl.
CPC .......... *H04L 67/2852* (2013.01); *H04L 67/288* (2013.01)
USPC .......................................... 709/226; 709/223
(58) Field of Classification Search
CPC .............. H04L 67/288; H04L 67/2852; H04L 67/2842; H04L 67/1029
USPC ................................................. 709/223–226
See application file for complete search history.

(56) References Cited

U.S. PATENT DOCUMENTS 7,085,234 B2 * 8/2006 Kimball et al. ............... 370/235
7,203,747 B2 * 4/2007 Bhat et al. .................... 709/224
(Continued)

FOREIGN PATENT DOCUMENTS

KR 1020080082227 9/2008
KR 1020090000028 1/2009

*Primary Examiner* — Phuoc Nguyen
(74) *Attorney, Agent, or Firm* — Marshall, Gerstein & Borun LLP

(57) ABSTRACT

The present invention relates to a cooperative caching method and a contents providing method using a request apportioning device. While collecting and controlling allocation history information on respective cache servers in a cache cluster, server load information, and threshold load management information including an object service threshold load and a cooperative threshold load, the request apportioning device uses allocation history information and server load information to check a load level of a cache server (first cache server) having first contents from among the cache servers in the first cache cluster, and uses threshold load management information to determine whether there is a cache server that is less than the object service threshold load from among the first cache servers, and when the first cache server that is less than the object service threshold load is not found, it determines whether there is a cache server (second cache server) that is less than the cooperative threshold load from among the first cache servers, and when the second cache server is found, it selects a cache server (third cache server) from among the second cache servers. When the first cache server that is less than the object service threshold load is not found, the request apportioning device uses allocation history information and server load information to select a cache server (fourth cache server) that is less than the object service threshold load in the first cache cluster, allow cooperative caching for the contents A between the third cache server and the fourth cache server, and provide the contents A.

19 Claims, 8 Drawing Sheets

(56) References Cited

U.S. PATENT DOCUMENTS

| | | | |
|---|---|---|---|
| 7,844,839 B2* | 11/2010 | Palmer et al. | 713/300 |
| 7,912,954 B1* | 3/2011 | Oesterreicher et al. | 709/226 |
| 7,979,504 B2* | 7/2011 | Denker et al. | 709/217 |
| 8,219,998 B2* | 7/2012 | Taylor et al. | 718/105 |
| 2006/0031374 A1* | 2/2006 | Lu et al. | 709/207 |
| 2009/0070489 A1* | 3/2009 | Lu et al. | 709/245 |
| 2009/0171821 A1* | 7/2009 | Denker et al. | 705/30 |
| 2010/0131638 A1* | 5/2010 | Kondamuru | 709/224 |
| 2010/0131659 A1* | 5/2010 | Narayana et al. | 709/228 |

* cited by examiner

COOPERATIVE CACHING METHOD AND CONTENTS PROVIDING METHOD USING REQUEST APPORTIONING DEVICE

BACKGROUND OF THE INVENTION (a) Field of the Invention

The present invention relates to a cooperative caching method and a contents providing method using a request apportioning device in a clustered application architecture.

(b) Description of the Related Art

In general, regarding a clustered application architecture, a load balancer or a domain name server (DNS) uses a load balancing algorithm appropriate for a service characteristic, that is, a scheduling method based on a round robin, least connection, hash, or weight value method to balance a load so that the load may not be heavily provided to a specific lower cache server in a cache cluster, and to request contents from a random cache server.

In this instance, the cache server having received a contents provision request may have the corresponding contents or not, and when it does not have them, it caches them through cooperative caching.

The cooperative caching process allows the cache servers in the cache cluster to share contents caching.

To perform the cooperative caching process, in the prior art, a cache server having no contents inquires of other cache servers in the same cache cluster whether they have corresponding contents to find the cache server that has them, and it requests the contents from the corresponding cache server. When none of the other cache servers in the same cache cluster have the corresponding contents, it downloads them from a source server and keeps them.

However, the conventional cooperative caching method performs cooperation for sharing contents within a short time when there are not many cache servers in the cache cluster, but the method requires much time for finding a cache server that has the contents when there are many cache servers. As a result, when there are many cache servers in the cache cluster, the time for providing contents is increased according to the prior art.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a cooperative caching method and contents providing method using a request apportioning device for providing contents that are requested by a client through a random cache server within a short time frame.

An exemplary embodiment of the present invention provides a cooperative caching method using a request apportioning device for selecting a cache server for transmitting contents according to a plurality of source servers, a plurality of cache clusters having a plurality of cache servers, and a contents transmission request by a client.

The cooperative caching method using a request apportioning device includes: (a) the request apportioning device collecting and controlling allocation history information on a cache server in a cache cluster, server load information, and threshold load management information including an object service threshold load and a cooperative threshold load; (b) the request apportioning device checking a load level on a cache server (a first cache server hereinafter) having first contents from among cache servers in a first cache cluster by using the allocation history information and the server load information; (c) the request apportioning device checking whether there is a cache server that is less than the object service threshold load from among the first cache server by using the threshold load management information; (d) when the first cache server that is less than the object service threshold load is not found, the request apportioning device determining whether there is a cache server (a second cache server hereinafter) that is less than the cooperative threshold load from among the first cache servers; (e) when the second cache server is found, the request apportioning device selecting a cache server (a third cache server hereinafter) from among the second cache servers; (f) when the first cache server that is less than the object service threshold load is not found, the request apportioning device selecting a cache server (a fourth cache server hereinafter) that is less than the object service threshold load in the first cache cluster by using the allocation history information and the server load information; and (g) the request apportioning device instructing a cooperative caching process for the contents A between the third cache server and the fourth cache server, wherein the object service threshold load is less than the cooperative threshold load.

Another embodiment of the present invention provides a contents providing method using a request apportioning device for selecting a cache server for transmitting contents according to a plurality of source servers, a plurality of cache clusters having a plurality of cache servers, and a contents transmission request by a client.

The contents providing method using a request apportioning device includes: (a) the request apportioning device checking a cache server (a first cache server hereinafter) having the first contents based on allocation history information for respective cache servers in a cache cluster (a first cache cluster hereinafter) according to a transmission request of first contents provided by the client; (b) the request apportioning device checking a cache server (a second cache server hereinafter) that is less than an object service threshold load from among the first cache servers by using server load information; (c) the request apportioning device allowing the first contents to be transmitted to the client from a cache server (a third cache server hereinafter) from among the second cache servers; (d) the request apportioning device determining whether a number of times of the first contents transmission requests is greater than a predetermined value within a predetermined period; (e) when a number of times of the first contents transmission requests is greater than a predetermined value within a predetermined period, the request apportioning device selecting a non-first cache server (a fourth cache server hereinafter) that is less than the object service threshold load in the first cache cluster; (f) when a number of times of the first contents transmission requests is greater than a predetermined value within a predetermined period, the request apportioning device selecting a cache server (a fifth cache server hereinafter) that is less than a cooperative threshold load from among the first cache server; and (g) the request apportioning device instructing a cooperative caching process between the fourth cache server and the fifth cache server to cache the first contents to the fourth cache server, wherein the object service threshold load is less than the cooperative threshold load.

Yet another embodiment of the present invention provides a contents providing method using a request apportioning device for selecting a cache server for transmitting contents according to a plurality of source servers, a plurality of cache clusters having a plurality of cache servers, and a contents transmission request by a client.

The contents providing method using a request apportioning device includes: (a) the request apportioning device checking a load level for a cache server (a first cache server hereinafter) having first contents from among respective cache servers in a first cache cluster by using the allocation history information and the server load information; (b) the request apportioning device determining whether there is a cache server that is less than the object service threshold load from among the first cache servers by using the threshold load management information; (c) when the first cache server that is less than the object service threshold load is not found, the request apportioning device determining whether there is a cache server (a second cache server hereinafter) that is less than the cooperative threshold load from among the first cache servers; (d) when the second cache server is provided, the request apportioning device selecting a cache server (a third cache server hereinafter) from among the second cache servers; (e) the request apportioning device selecting a cache server (a fourth cache server hereinafter) that is less than the object service threshold load in the first cache cluster by using the allocation history information and the server load information; (f) the request apportioning device instructing to perform a cooperative caching process for the contents A between the third cache server and the fourth cache server; and (g) the request apportioning device allowing the first contents to be transmitted to the client from the fourth cache server, wherein the object service threshold load is less than the cooperative threshold load.

According to the embodiments of the present invention, the request apportioning device for controlling allocation history and load information of the cache server controls cooperative caching among respective cache servers in the cache cluster and thereby quickly processes the contents transmission request from the client.

DETAILED DESCRIPTION OF THE EMBODIMENTS

Figure 1:
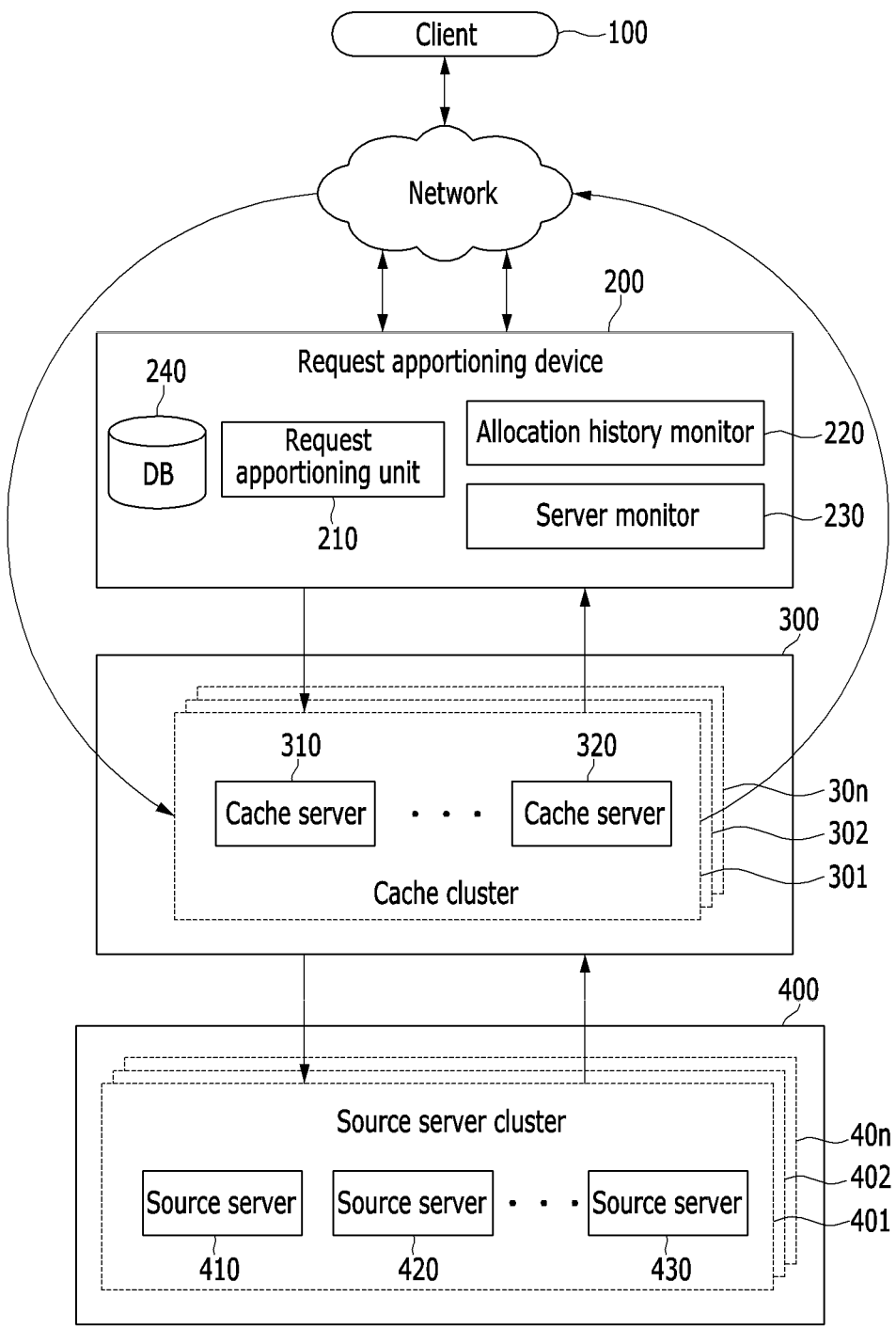
FIG. 1 shows a schematic diagram of a contents providing system using a contents providing method using a request apportioning device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A contents providing method using a request apportioning device according to an exemplary embodiment of the present invention will now be described in detail with reference to accompanying drawings.

FIG. 1 shows a schematic diagram of a contents providing system using a contents providing method using a request apportioning device according to an exemplary embodiment of the present invention.

As shown in FIG. 1, the contents providing system represents a system that is appropriate for performing a cooperative caching process among cache servers and quickly providing contents based on respective threshold loads of the cache servers in the cache cluster on the world wide web (WWW). The contents providing system includes a request apportioning device 200 for interfacing with a client 100, a cache cluster group 300 including a plurality of cache clusters (301, 302, . . . , 30$n$), and a source server cluster group 400 including a plurality of source server clusters (401, 402, . . . , 40$n$).

In this instance, at least one request apportioning device is installed in the load balancing system, and for ease of description, a single request apportioning device is shown.

The client 100 represents a user terminal for accessing the request apportioning device 200 and requesting a desired object (various kinds of data such as multimedia or images, which will be referred to as contents hereinafter.)

Contents request forms used by the client 100 includes html, xml, and user defined formats, and the request is expressed as the TCP/IP. Request items include an identity of an Internet service provider (ISP), sender information (an IP address of a requesting client), request contents information (information for identifying contents in a unique manner), and receiver information (an IP address and a port of the request apportioning device).

The cache cluster group 300 includes a plurality of cache clusters (301, 302, . . . , 30$n$) each of which is connected to the request apportioning device 200. The cache clusters (301, 302, . . . , 30$n$) respectively include a plurality of cache servers. For example, the cache cluster 301 includes a plurality of cache servers (310, . . . , 320). The cache servers (310, . . . , 320) store random contents provided to the client 100 or contents that are stored according to dispersion of information caused by a near position from the client.

The respective cache servers provide load state information including CPU usage rate, I/O usage rate, memory usage rate, and available storage capacity to a server monitor 230 so that the server monitor 230 may know a load state.

The source server cluster group 400 includes a plurality of source server clusters (401, 402, . . . , 40$n$) each of which includes a plurality of source servers. For example, the source server cluster 401 includes a plurality of source servers (410, 420, . . . , 430). The respective source servers (410, 420, . . . , 430) store their own unique contents, and provide specific contents to the cache server when the cache server or/and the request apportioning device 200 requests them.

The respective source servers provide their load state information to the server monitor 230 so that it may know its load state.

Finally, upon receiving a contents transmission request from the client 100, the request apportioning device 200 uses an allocation history table T1, a server load table T2, and a threshold load managing table T3 of a database 240 to select a cache server for providing contents requested by the client 100, and causes the contents to be transmitted between the selected cache server and the client 100.

When selecting a single cache server for transmitting contents, if needed, the request apportioning device 200 can allow cooperative caching between the cache servers of the single cache cluster so that a cache server that is less than an object service threshold load may provide the contents requested by the client 100.

That is, the request apportioning device 200 performs a cooperative caching process in a single cache cluster so that a cache server may provide contents according to the following characteristics.

1. When the client's requests on specific contents run, the request apportioning device 200 receives the client's transmission request at the cache server that is less than the object service threshold load having the corresponding contents according to a predefined policy.

2. When a plurality of cache servers have the contents, the request apportioning device 200 connects the client request to the cache server that has the least load from among the corresponding cache servers.

3. When the cache server in the cluster misses caching on transmission of the contents requested by the client 100, the request apportioning device 200 checks the contents of other cache servers before requesting the corresponding contents from the source server, and allows the server with the least load from among the cache servers having the contents to reproduce (i.e., cache) the contents through cooperative caching.

4. When the cache servers having the requested contents are greater than the threshold load, the request apportioning device 200 apportions the client request to a cache server that does not have the corresponding contents to cache the corresponding contents through a cooperative caching process and process the client request.

5. Allocation information of the cache server having contents is changeable in real-time so the request apportioning device 200 controls the contents with a large amount of requests to be cached to a peer cache server that has no requested contents according to the contents request quantity checked in real-time.

6. A number of cache servers available for supplying contents according to the increasing demand on the contents are actively installed up to the limit of hardwired capacity.

7. Contents distribution history and system information are re-directed to the cache server that can provide contents to a new client through continuous communication with the request apportioning device, thereby increasing stability of the entire service and distributing the load.

The above-characterized request apportioning device 200 includes a request apportioning unit 210, an allocation history monitor 220, the server monitor 230, and a database 240.

The database 240 stores an allocation history table (refer to FIG. 2) storing allocation history information as table values, a server load table (refer to FIG. 3) storing load level information of respective cache servers as table values, and a threshold load managing table (refer to FIG. 4) storing load threshold values for respective managing points of the cache servers as table values.

Load level information of the cache server represents information for indicating a state of the current load of the corresponding cache server, and in detail, it identifies whether the current load is greater or less than a predetermined threshold load. In this instance, when the load level information is greater than the predetermined threshold load, the load is determined to be heavy, and when less than the same, it is determined that it is difficult to provide a service.

Load level information of the cache cluster is used to find a cache cluster with less load from among a plurality of cache clusters. Allocation history information is matched per specific content, and it represents history information on the cache servers having processed the corresponding contents, that is, apportionment information on the cache servers. Allocation history information is used to find a cache server that may contain the requested contents. Load information of the cache server represents information for indicating a load state of the corresponding cache server.

The database 240 includes identification information on the Internet service provider (ISP) matching an IP of the client. In this instance, the ISP is provided near the client on the network. Here, ISP identification information is used when the cache server and the source server are dispersed and installed in the ISP.

The request apportioning unit 210 parses text of the contents transmission request provided by the client 100, and finds and selects the cache server with the least load from among a plurality of cache servers based on load level information of the cache server and allocation history information in a time frame.

The allocation history monitor 220 provides allocation history information to be used by the request apportioning unit 210, and it collects cache server allocation history recorded in each request apportioning device in the system, processes them in an integrated manner, and distributes them to the request apportioning device.

The server monitor 230 collects load information of the respective cache servers and the respective source servers and provides the collected load state information to the request apportioning unit 210. In this instance, the server monitor 230 uses load information of the respective cache servers to generate load level information of the cache servers and provide the same.

In this instance, the allocation history monitor 220 and the server monitor 230 can be included in the request apportioning device 200, and if needed, they can be configured to be independent devices.

In addition, when the respective cache clusters are dispersed and installed in the important Internet service provider (ISP) and the contents requested by the user are provided to him through the cache cluster that is installed in the ISP that is nearest him, the request apportioning unit 210 can have an allocation function following a topology for parsing Internet protocol (IP) information of the user and transmitting a request to the cache cluster in the ISP that is the nearest him, which minimizes the network section between him and the cache cluster and thereby increases the contents transmission speed to the maximum.

Various kinds of information used by the request apportioning unit 210 will now be described with reference to FIG. 2 to FIG. 4.

The information used by the request apportioning unit 210 includes allocation history information for notifying contents possessed states for the respective cache servers, load level information of the respective cache servers, and threshold load information of the cache servers for respective management points. The above-noted information is managed by tables as shown in FIG. 2 to FIG. 4.

Figure 2:
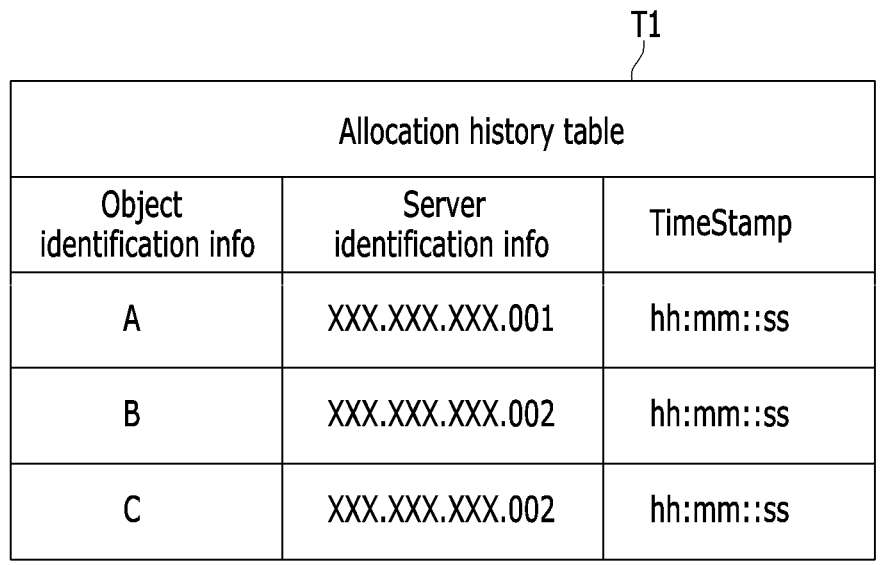
FIG. 2 shows an allocation history table for a request apportioning unit according to an exemplary embodiment of the present invention.

FIG. 2 shows an allocation history table for a request apportioning unit according to an exemplary embodiment of the present invention. The allocation history table T1 shown in FIG. 2 represents a table for the request apportioning device 200 to write a contents possessing history that is allocated to the cache server so as to process the contents request provided by the client 100, and it includes object identification information (i.e., contents identification information), cache server identification information, and a time stamp. The allocation history table T1 is used for the request apportioning unit 210 to identify the cache servers used to transmit the requested contents.

Figure 3:
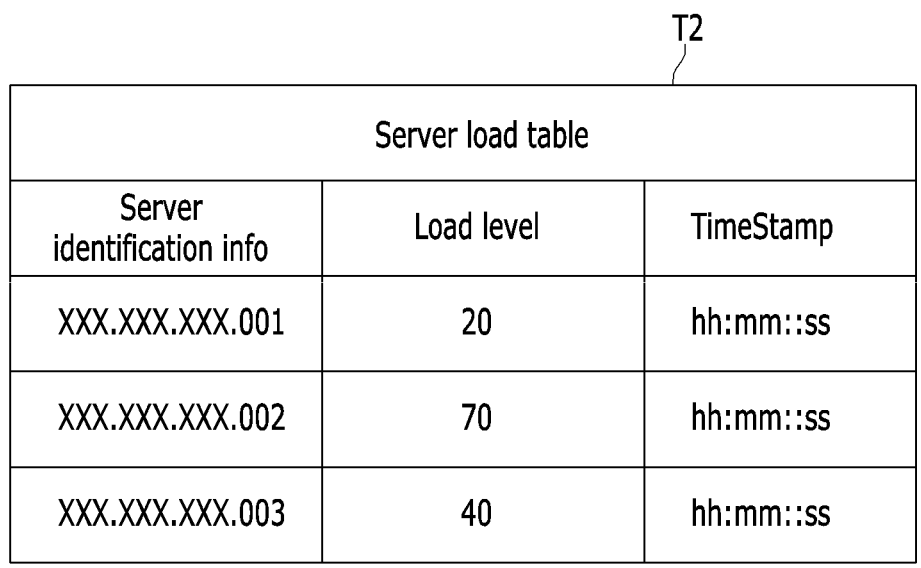
FIG. 3 shows a server load table for a request apportioning unit according to an exemplary embodiment of the present invention.

FIG. 3 shows a server load table for a request apportioning unit according to an exemplary embodiment of the present invention. A server load table T2 shown in FIG. 3 represents a table for writing load levels of the cache server and the source server, and it includes server identification information, a load level, and a time stamp 630. The server load table T2 is used for the request apportioning unit 210 to select a cache server.

In this instance, the load level is written by the server monitor 230, and it represents a value generated by multiplying an influence provided by values of respective items included in the load state information by a weight value, converting them into percentages, and adding the same to the load state information of the cache server transmitted to the server monitor 230. A cache server in which the time stamp is written in the server load table 600 before a temporal interval can be considered as a server that is not operable, and the written cache server is considered to be a target cache server to which the request apportioning unit 210 may service the contents.

Figure 4:
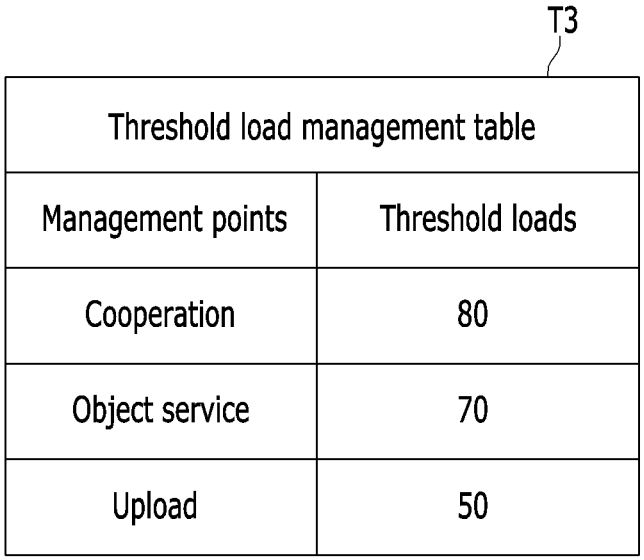
FIG. 4 shows a threshold load managing table for a request apportioning unit according to an exemplary embodiment of the present invention.

FIG. 4 shows a threshold load managing table for a request apportioning unit according to an exemplary embodiment of the present invention. A threshold load management table T3 shown in FIG. 4 represents a table for defining a threshold load of the cache server, and it includes a management point and a threshold load.

The threshold load table T3 is used for the request apportioning unit 210 to determine whether the corresponding cache server may be provided to the contents providing service, and may perform a cooperative caching process in comparison with the load level of the cache server.

The management point indicates a characteristic of the threshold load, and it includes cooperation for indicating the threshold load applicable to cooperative caching, an object service for indicating the threshold load applicable to transmission of contents, and an upload for indicating the threshold load on the user access.

In this instance, the cooperative threshold load is set to be greater than an object service threshold load so as to perform cooperative caching when the load of the cache server is greater than the threshold load of the object service. Further, when the load of the cache server is greater than the cooperative threshold load, the corresponding contents are cached from the source server.

A plurality of contents providing methods for a client 100 to receive contents from the request cache server according to an exemplary embodiment of the present invention will now be described.

Regarding the first method, upon receiving a request on specific contents from the client 100, the request apportioning device 200 selects a cache server with less load from the request apportioning unit 210 and requests the contents from the selected cache server. In this instance, the request apportioning unit 210 provides identification information of contents and identification information of client when the contents are requested. The cache server provides the contents requested by the client 100 to the request apportioning device 200 and the request apportioning device 200 provides the contents provided by the cache server to the client 100.

Regarding the second method, upon receiving a request on specific contents from the client 100, the request apportioning device 200 selects a specific cache server from the request apportioning unit 210 and transmits path information (e.g., an IP address of the cache server) of the selected cache server to the client 100. The client 100 uses identification information of the cache server to access the cache server and requests contents from the cache server. The cache server 200 provides the corresponding contents to the client 100. In this instance, the request apportioning unit 210 having found the cache server to allocate a contents request records contents identification information and an IP address of the cache server in a request apportioning history in a local database 240 and refers to the corresponding record in the case of a subsequent request. The ISP information is usable when the cache server is dispersed on the network, and it is not usable for acquisition of cache server information and is removable if needed when the cache server is not dispersed thereon.

Regarding the third method, upon receiving a request on specific contents from the client 100, the request apportioning device 200 selects a specific cache server from the request apportioning unit 210 and provides path information (e.g., an IP address of the client) of the client 100 to the selected specific cache server. The specific cache server uses the IP address of the client to provide the contents to the client 100.

Regarding the fourth method, the direct routing method is used. For this, the request apportioning device 200 and the respective cache servers share a virtual Internet protocol (IP) address. In this instance, a virtual IP is set for a network interface between the request apportioning device 200 and the cache server. Upon receiving the request on the specific contents from the client 100, the request apportioning unit 210 selects a specific cache server and requests contents. The specific cache server has the same virtual IP as the request apportioning device 200 so it provides the contents to the client 100 without passing through the request apportioning device 200.

A cooperative caching method using a request apportioning device and a contents providing method according to an exemplary embodiment of the present invention will now be described with reference to FIG. 5 to FIG. 9.

Figure 9:
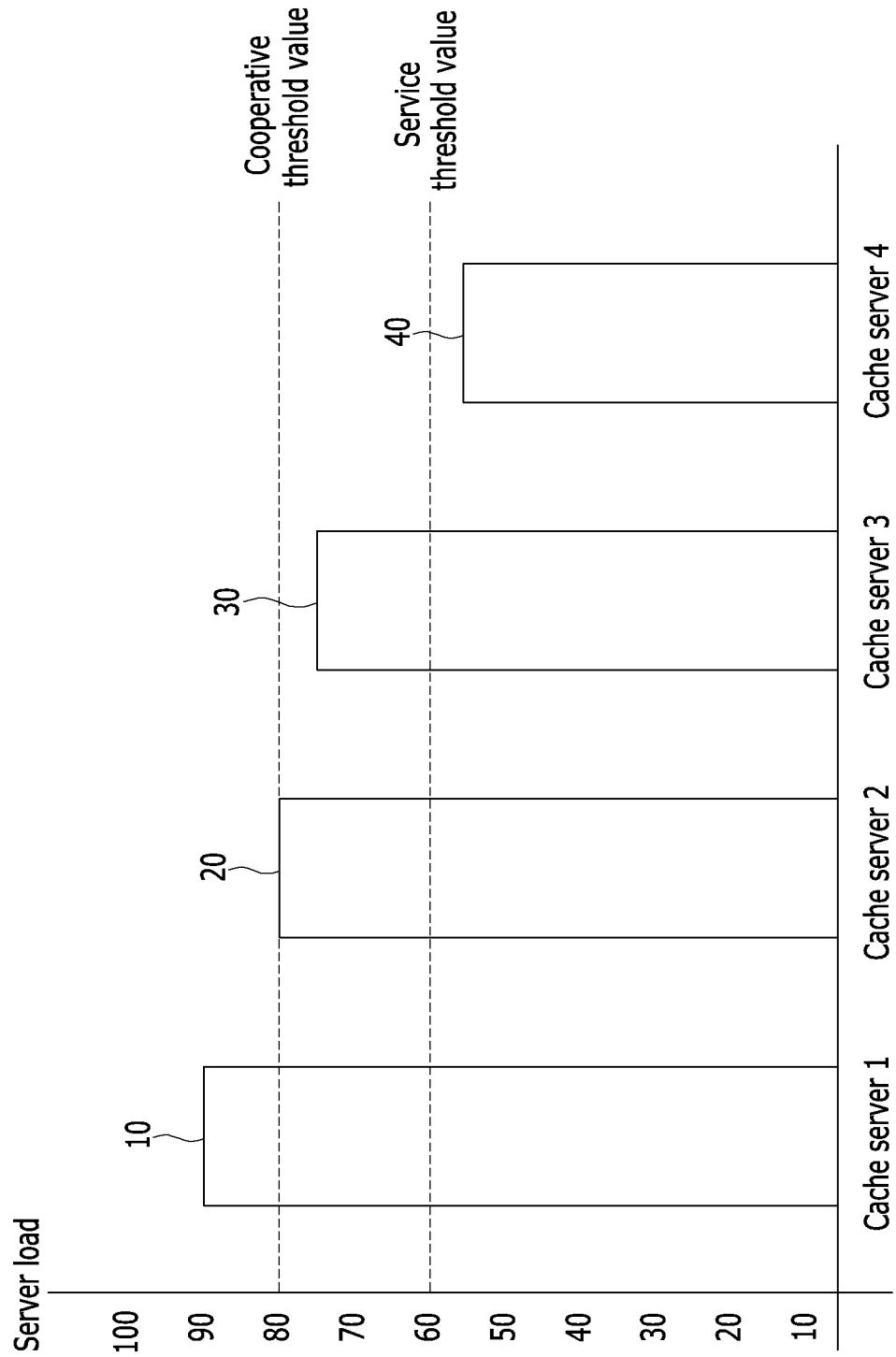
FIG. 9 shows a cooperative caching method and a contents providing method using a request apportioning device according to an exemplary embodiment of the present invention.

A cooperative caching method using a request apportioning device according to an exemplary embodiment of the present invention will now be described with reference to FIG. 9. FIG. 9 shows a cooperative caching method and a contents providing method using a request apportioning device according to an exemplary embodiment of the present invention.

As shown in FIG. 9, there is a cache cluster including four cache servers (10 to 40) with contents A and a plurality of cache servers (not shown) without the contents A. In this instance, the load level of the first cache server 10 is 90%, the load level of the second cache server 20 is 80%, the load level of the third cache server 30 is 75%, and the load level of the fourth cache server 40 is 55%.

The threshold load managing table T3 has registered the object service threshold load as 60% and the cooperative threshold load as 80%.

According to the above-noted preconditions, when the client 100 requests the contents A, the first cache server 10 to the third cache server 30 are excluded from selection of a cache server to provide contents, and the fourth cache server 40 that is less than the object service threshold load is selected as a cache server for providing the contents since their load levels are greater than the object service threshold load, at 60%. When the number of cache servers that are less than the object service threshold load is greater than two, the request apportioning device 200 selects one of the at least two cache servers or the single cache server with the lowest load level.

When the load level of the fourth cache server 40 reaches 70% as shown with the dotted line, the first to fourth cache servers (10 to 40) become greater than the object service threshold load so the request apportioning device 200 performs cooperative caching so as to cache the contents A to another cache server (not having contents A) in the same cluster.

In this instance, the request apportioning device 200 finds the cache server having a load level that is less than the cooperative threshold load from among the cache servers (10 to 40), and it determines the third cache server 30 and the fourth cache server 40 to be available for cooperative caching as shown in FIG. 9.

The request apportioning device 200 selects one of the third and fourth cache servers 30 and 40 or the fourth cache server 40 that has the lowest load level, and instructs cooperative caching. Further, the request apportioning device 200 performs cooperative caching by selecting a cache server having the load level that is less than the object service threshold load from among the cache servers that do not have the contents A in the same cache cluster. Accordingly, cooperative caching is performed between one of the third and fourth cache servers 30 and 40 that is selected for the cooperative caching process and the single cache server that is less than the object service threshold load from among the cache servers that do not have the contents A.

In addition, when there is no cache server that is less than the cooperative threshold load from among the first to fourth cache servers (10 to 40), the request apportioning device 200 caches the contents A to the single cache server that is less than the object service threshold load from among the cache servers having no contents A from the source server.

Figure 5:
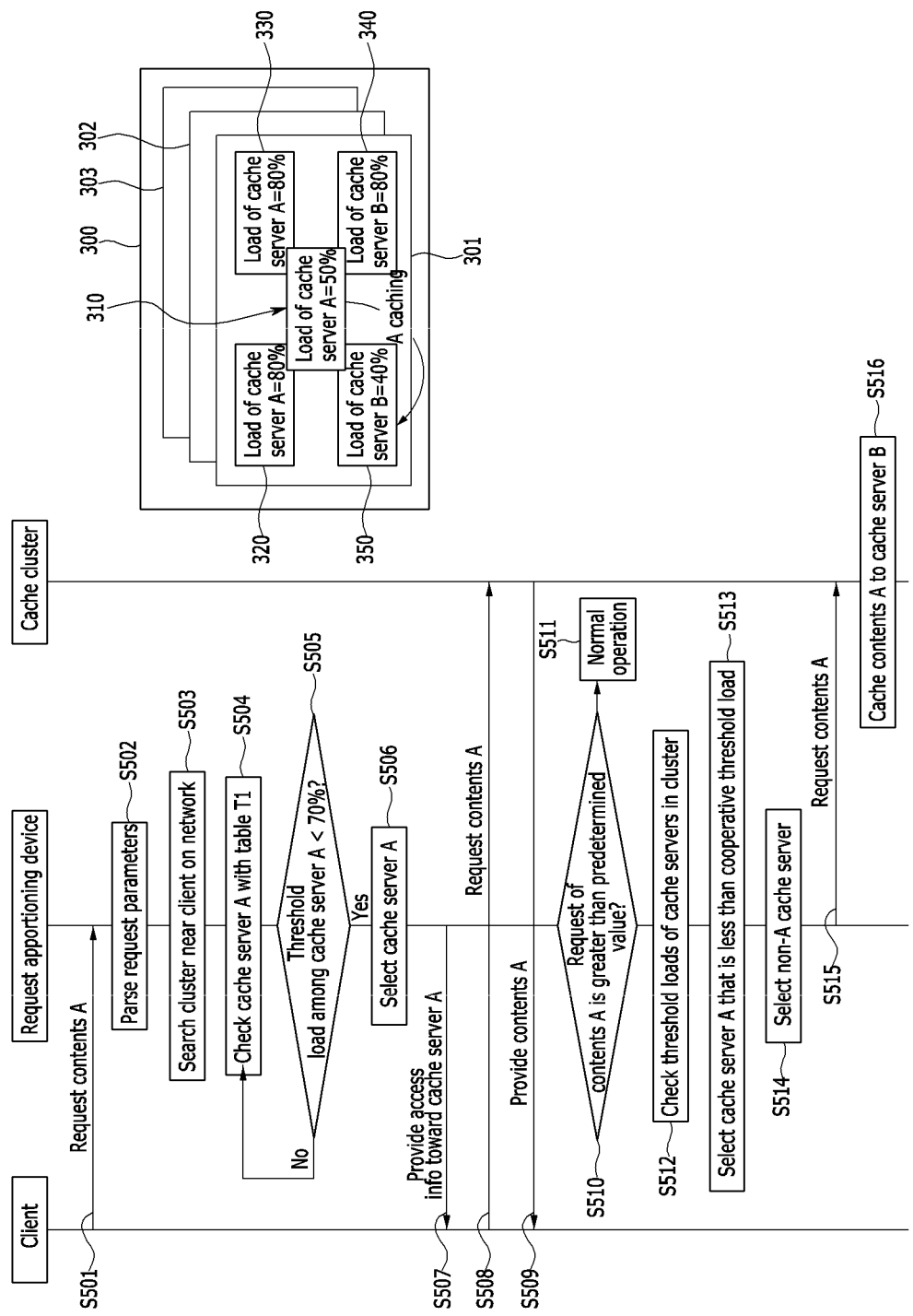
FIG. 5 shows a flowchart of a cooperative caching method using a request apportioning device and a contents providing method using cooperative caching according to a first exemplary embodiment of the present invention.

FIG. 5 shows a flowchart of a cooperative caching method using a request apportioning device according to a first exemplary embodiment of the present invention, and a contents providing method using the cooperative caching method in which the object service threshold load is 70% and the cooperative threshold load is 80%.

In FIG. 5, a cache cluster 301 in a cache cluster group 300 will be called a cache cluster that is provided near the client 100, a cache server having contents A will be referred to as a cache server A, and a cache server having contents B will be called a cache server B. The cluster B does not have the contents A.

The client 100 requests the contents A, and the request apportioning device 200 receives a contents transmission request of the client 100 (S501).

Upon receiving the contents transmission request from the client 100, the request apportioning unit 210 of the request apportioning device 200 parses text of the object transmission request to extract parameters, that is, an IP address of the client 100, and request contents identification information (S502).

The request apportioning unit 210 finds a cache cluster that is provided near the client 100 on the network from the IP address of the database 240 and the ISP mapping table (S503).

The request apportioning unit 210 refers to the allocation history table T1 to find the cache server A having the contents A in the cache cluster checked in S503, and then extracts an IP address list (i.e., a cache list) of the cache server A (S504). It is assumed in S504 that there is an IP address list of the cache server A.

The request apportioning unit 210 uses a server load table T2 to determine whether there is a cache server A that is less than a predetermined object service threshold load (e.g., 70%) from among the cache servers A of the extracted cache list (S505).

When there is no cache server A that is less than the threshold load from among the cache servers A of the extracted cache list, the request apportioning unit 210 checks the threshold load of the cache server A for each predetermined time period, which is repeated until such a cache server A that is less than the threshold load is found.

In addition, when there is a cache server A that is less than the threshold load is found from among the cache servers A of the extracted cache list, the request apportioning unit 210 selects a single cache server A that is less than the threshold load or a cache server A having the lowest threshold load (S506).

In this instance, in the exemplified case of the cache cluster 301 shown in FIG. 5, the cache cluster 301 has four cache servers A and one B cache server 350, the cache server A310 has a load of 50%, the cache server A320 has a load of 80%, the cache server A330 has a load of 80%, and the cache server A340 has a load of 80%. The cache server B350 has a load of 40%.

Therefore, in S506, the request apportioning unit selects the cache server A310 from among the cache servers A (310 to 340) in the cache cluster 301.

When selecting the cache server 310, the request apportioning unit 210 generates path information of the cache server A310 and provides it to the client 100 (S507).

The client 100 accesses the corresponding cache server A310 according to the path information of the cache server A310 and requests to transmit the contents A (S508).

Upon receiving the transmission request of the contents A from the client 100, the cache server A310 provides the contents A to the client 100 (S509).

The request apportioning unit 210 performs a process that corresponds to the transmission request of the contents A through S509 and checks whether the transmission request is continuously received.

That is, the request apportioning unit 210 determined whether a number of times of the transmission request on the contents A is greater than a predetermined value (e.g., 10 or 100 times) for a predetermined time frame (S510).

In the above-noted S510, when the transmission request on the contents A from the client is below a predetermined value, the request apportioning unit 210 performs a predetermined next general operation (e.g., monitoring the contents transmission request) (S511).

However, in S510, when the transmission request on the contents A from the client is above the predetermined value, the request apportioning unit 210 performs cooperative caching so as to increase the number of cache servers A.

That is, when the transmission request on the contents A from the client is greater than the predetermined value, the request apportioning unit 210 uses allocation history table T1 to check a load of the cache server that does not have the contents A in the cache cluster 301 (hereinafter a non-A cache server), such as the cache server B or the cache server C (S512).

The request apportioning unit 210 uses the server load table T2 and the threshold load managing table T3 to select the cache server A310 that is less than the cooperative threshold load from among the cache servers (310 to 340) (S513). The request apportioning unit 210 selects a random cache server having the load that corresponds to the threshold load or a cache server that has the lowest load from among the non-A cache servers (S514). FIG. 5 shows the cache server selected in S514 to be the cache server B350.

When selecting the cache server B350 in S514, the request apportioning unit 210 requests the cache server A310 having a low load to cache the contents A to the cache server B350 (S515), and the cache server A310 provides the contents A to the cache server B350 so that the cache server B350 may cache the contents A (S516).

The stages of S514 and S515 are changeable as follows. That is, the request apportioning unit 210 requests the cache server B350 to receive the contents A from the cache server A310 and cache the same, and the cache server B350 requests the contents A from the cache server A310 to receive them and cache them.

A contents providing method using a request apportioning device according to a second exemplary embodiment of the present invention will now be described with reference to FIG. 6.

Figure 6:
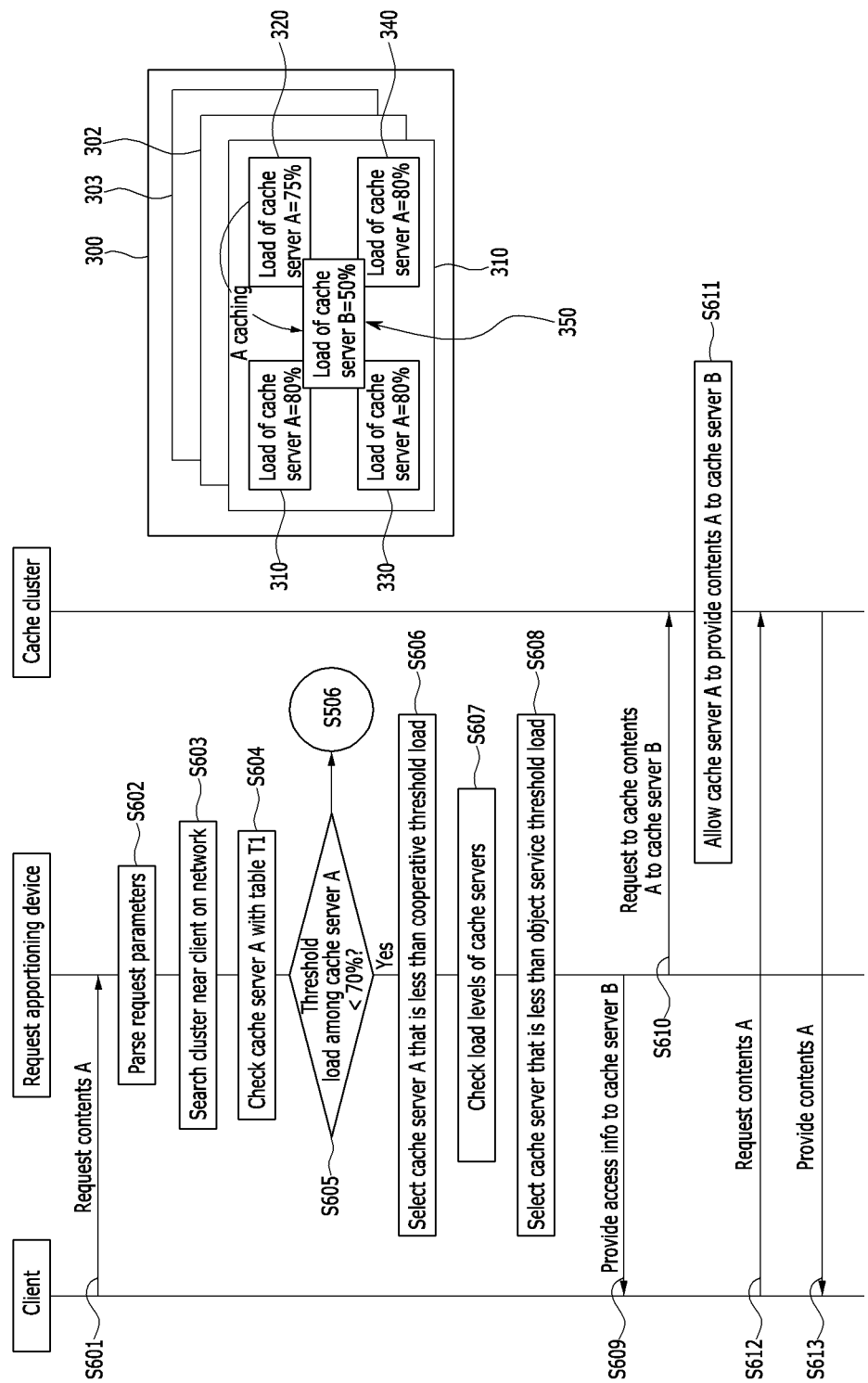
FIG. 6 shows a flowchart of a cooperative caching method using a request apportioning device and a contents providing method using cooperative caching according to a second exemplary embodiment of the present invention.

FIG. 6 shows a flowchart of a contents providing method using a request apportioning device according to a second exemplary embodiment of the present invention in which the object service threshold load is 70% and the cooperative threshold load is 80%. In the cache cluster group 300, the cache cluster 301 will be called a cache cluster that is provided near the client 100, the cache server having the contents A will be called the cache server A, and the cache cluster having the contents B will be referred to as the cache server B. The cache server B does not have the contents A.

The client 100 requests the contents A and the request apportioning device 200 receives a contents transmission request from the client 100 (S601).

When receiving the contents transmission request from the client 100, the request apportioning unit 210 of the request apportioning device 200 parses text of the object transmission request to extract parameters, that is, an IP address of the client 100 and request contents identification information (S602).

The request apportioning unit 210 finds a cache cluster that is near the client 100 on the network from the IP address of the database 240 and the ISP mapping table (S603).

The request apportioning unit 210 refers to the allocation history table T1 to extract an IP address list (i.e., a cache list) of the cache server A having the contents A in the cache cluster checked in S603 (S604). Here, in S604, there is an IP address list of the cache server A.

The request apportioning unit 210 uses the server load table T2 to determine whether there is a cache server A that is less than the object service threshold load (e.g., 70%) from among the cache servers of the cache list (S605).

In S605, when the cache server A that is less than the object service threshold load is found from among the cache servers A of the extracted cache list, the request apportioning unit 210 performs the stage of S506 from among the processes according to the first exemplary embodiment of the present invention that is described with reference to FIG. 5, and then performs the processes S507 to S516.

In S605, when the cache server A that is less than the object service threshold load is not found from the cache servers A of the extracted cache list, the request apportioning unit 210 uses the threshold load managing table T3 to selects the cache server A 320, a single cache server, that is less than the cooperative threshold load from among the cache servers (310 to 340) (S606).

The request apportioning unit 210 uses the allocation history table T1 and the server load table T2 to check load levels of the entire cache servers in the cache cluster 301 (S607), and selects a single cache server that is less than the object service threshold load (S608).

Here, in the exemplified case of the cache cluster 301 shown in FIG. 6, the cache cluster 301 has four cache servers A, the cache server 310 A has a load of 80%, the cache server A320 has a load of 75%, the cache server A330 has a load of 80%, and the cache server A340 has a load of 80%. Further, the cache cluster 301 has the cache server B350 having a load of 50%.

Therefore, in S607 and S608, the request apportioning unit 210 confirms that the cache server B350 having a load that is less than the threshold load and selects the cache server B350.

When selecting the cache server B350, the request apportioning unit 210 generates path information of the selected cache server B350 and provides it to the client 100 (S609).

Simultaneously, the request apportioning unit 210 provides identification information of the contents A and path information (i.e., an IP address) of the cache server B350 to the cache server A320 to request provision of the contents A to the cache server B350 through cooperative caching (S610).

Further, the request apportioning unit 210 provides identification information of the contents A and the IP address of the cache server A320 to the cache server B350 to request to cache the contents A through cooperative caching.

The cache server A320 provides the contents A to the cache server B350 according to the request by the request apportioning unit 210, and the cache server B350 receives the contents A and caches them (S611).

The client 100 accesses the cache server B350 to request the contents A according to the path information toward the cache server B350 provided by the request apportioning unit 210 through S608 (S612), and the cache server B350 provides the contents A to the client 100 corresponding to the request by the client 100 (S613).

A contents providing method using a request apportioning device according to a third exemplary embodiment of the present invention will now be described with reference to FIG. 7.

Figure 7:
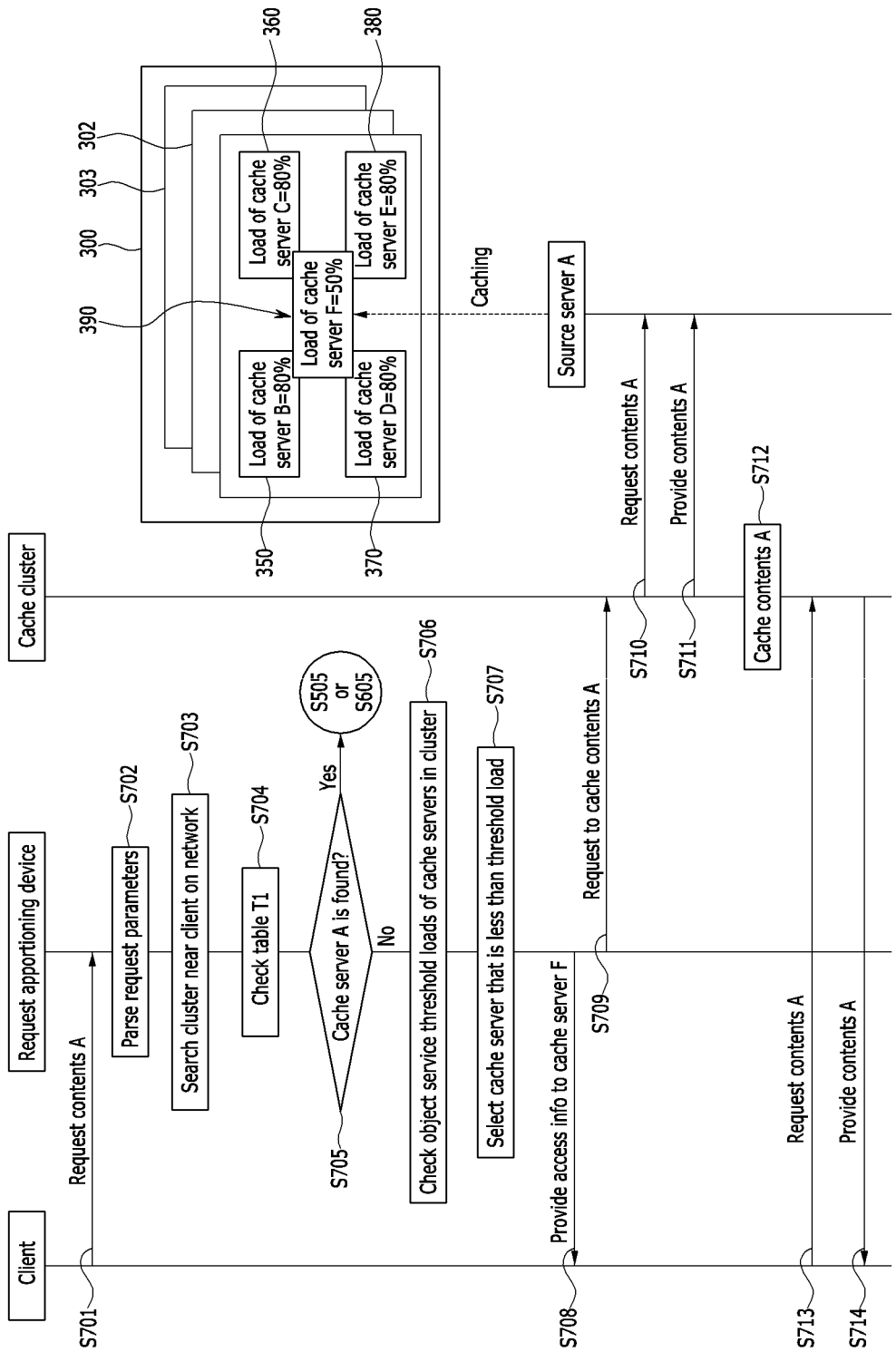
FIG. 7 shows a flowchart of a cooperative caching method using a request apportioning device and a contents providing method using cooperative caching according to a third exemplary embodiment of the present invention.

FIG. 7 shows a flowchart of a contents providing method using a request apportioning device according to a third exemplary embodiment of the present invention in which the object service threshold load is 70% and the cooperative threshold load is 80%.

In the cache cluster group 300, the cache cluster 301 will be called a cache cluster that is provided near the client 100, the cache server having the contents B will be called the cache server B, the cache server having the contents C will be called the cache server C, the cache server having the contents D will be called the cache server D, the cache server having the contents E will be called the cache server E, and the cache server having the contents F will be called the cache server F. In this instance, the cache servers B, C, D, E, and F do not have the contents A.

The client 100 requests contents A, and the request apportioning device 200 receives the contents transmission request from the client 100 (S701).

When receiving the contents transmission request from the client 100, the request apportioning unit 210 of the request apportioning device 200 parses text of the object transmission request to extract parameters, that is, an IP address of the client 100 and request contents identification information (S702).

The request apportioning unit 210 finds an IP address in the database 240 and a cache cluster that is provided near the client 100 on the network from the ISP mapping table (S703).

The request apportioning unit 210 refers to the allocation history table T1 (S704) to determine whether there is an IP address list (i.e., cache list) of the cache server A having the contents A in the cache cluster checked in S703 (S705).

In S705, when the cache list is found, the request apportioning unit 210 performs the process S505 or S605.

When no cache list is found, the request apportioning unit 210 uses the allocation history table T1 and the server load table T2 to check load levels of all cache servers in the cache cluster 301 (S706).

When the cache cluster 301 shown in FIG. 7 is exemplified, the cache cluster 301 includes the cache servers B, C, D, E, and F, the cache server 350 has a load of 80%, the cache server C360 has a load of 80%, the cache server D370 has a load of 80%, and the cache server E380 has a load of 80%. Further, the cache server F390 has a load of 50%.

Therefore, in S706, the request apportioning unit 210 confirms that the cache server F350 having a load that is less than the object service threshold load is found, and selects the cache server F390 (S707). When there is a cache server that is less than the threshold load in addition to the cache server F350, the request apportioning unit 210 selects one of them or the cache server having the lowest load.

When selecting the cache server F390, the request apportioning unit 210 generates path information of the selected cache server F390 and provides it to the client 100 (S708).

The request apportioning unit 210 provides identification information of the contents A and path information (i.e., IP address) of the source server 410 to the cache server F390 to request to cache the contents A through the source server 410 (S709).

Also, the request apportioning unit 210 can request to provide the contents A to the cache server F370 by providing identification information of the contents A and an IP address of the cache server F370 to the source server 410.

The cache server F390 accesses the source server 410 to request the contents A according to the request by the request apportioning unit 210 (S710), and receives them from the source server 410 and caches them (S711) and (S712).

The client 100 accesses the cache server F390 to request the contents A according to path information of the cache server F390 provided by the request apportioning unit 210 through S707 (S713), and the cache server F390 provides the contents A to the client 100 corresponding to the request by the client 100 (S714).

A contents providing method using a request apportioning device according to a fourth exemplary embodiment of the present invention will now be described with reference to FIG. 8.

Figure 8:
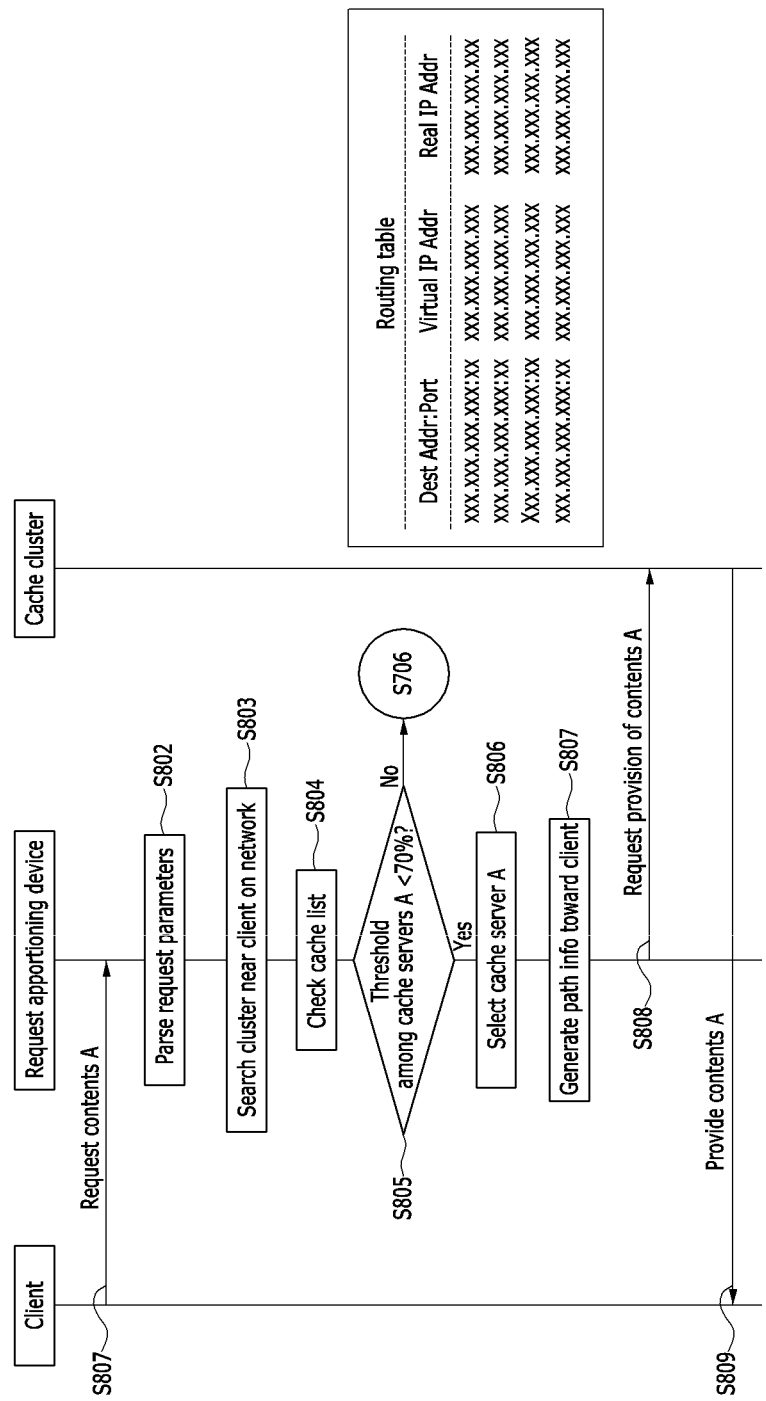
FIG. 8 shows a flowchart of a contents providing method using a request apportioning device according to a fourth exemplary embodiment of the present invention.

FIG. 8 shows a flowchart of a contents providing method using a request apportioning device according to a fourth exemplary embodiment of the present invention.

The client 100 requests the contents A, and the request apportioning device 200 receives the contents transmission request from the client 100 (S801).

When receiving the contents transmission request from the client 100, the request apportioning unit 210 parses text of the object transmission request to extract parameters, that is, an IP address of the client 100 and request contents identification information (S802).

The request apportioning unit 210 finds the cache cluster that is provided near the client 100 on the network from the IP address in the database 240 and the ISP mapping table (S803).

The request apportioning unit 210 refers to the allocation history table T1 to check whether there is an IP address list (i.e., cache list) of the cache server A having the contents A in the cache cluster checked in S703 (S804).

The request apportioning unit 210 uses the server load table T2 to determine whether there is a cache server that is less than a predetermined threshold load (e.g., 80%) from among the cache servers of the cache list (S805).

In S805, the request apportioning unit 210 performs the process of S705 when the cache server A that is less than the object service threshold load is not found from among the cache servers A of the extracted cache list.

In S805, when the cache server A that is less than the object service threshold load is found from among the cache servers A of the extracted cache list, the request apportioning unit 210 selects a random cache server A or a single cache server A with the lowest load level (S806).

The request apportioning unit 210 generates path information including an IP address of the client 100 and identification information of the contents A (S807), and provides a provision request of the contents A including path information toward the client 100 to the cache server A selected in S806 (S808).

The cache server A provides the contents A to the client 100 according to the IP address of the client 100 included in the provision request of the received contents A (S809).

According to the exemplary embodiment referring to FIG. 8, a specific cache server provides the contents without using the request apportioning device 200 by using path information of the client 100. In a like manner, according to another exemplary embodiment of the present invention, when a direct routing method is used, the specific cache server has the same virtual IP as the request apportioning device 200 and the virtual IP is set on the network interface so the contents are provided to the client 100 without using the request apportioning device 200.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cooperative caching method using a request apportioning device for selecting a cache server for transmitting contents according to a plurality of source servers, a plurality of cache clusters having a plurality of cache servers, and a contents transmission request by a client, comprising:

(a) the request apportioning device collecting and controlling allocation history information on a cache server in a cache cluster, server load information, and threshold load management information including an object service threshold load and a cooperative threshold load;

(b) when a contents A is requested by the client, the request apportioning device checking a load level on a cache server (a first cache server hereinafter) having the contents A from among cache servers in a first cache cluster by using the allocation history information and the server load information;

(c) the request apportioning device checking whether there is a cache server that is less than the object service threshold load from among the first cache server by using the threshold load management information;

(d) when the first cache server that is less than the object service threshold load is not found, the request apportioning device determining whether there is a cache server (a second cache server hereinafter) that is less than the cooperative threshold load from among the first cache servers, wherein the object service threshold load is less than the cooperative threshold load;

(e) when the second cache server is found, the request apportioning device selecting a cache server (a third cache server hereinafter) from among the second cache servers, the third cache server being greater than or equal to the object service threshold load and being less than the cooperative threshold load;

(f) the request apportioning device selecting a cache server (a fourth cache server hereinafter) that is less than the object service threshold load in the first cache cluster by using the allocation history information and the server load information, the fourth cache server not having the contents A; and (g) the request apportioning device instructing a cooperative caching process for the contents A between the third cache server and the fourth cache server, the fourth cache server obtaining the contents A and providing the contents A to the client.

2. The cooperative caching method of claim 1, further comprising
(h) the request apportioning device omitting the (e), performing the (f), and instructing the fourth cache server to cache the contents A from the source server having the contents A when the second cache server is not found according to the (d).

3. The cooperative caching method of claim 1, further comprising
(i) the request apportioning device omitting the (b) to the (e), performing the (f), and instructing the fourth cache server to cache the contents A from the source server having the contents A when the first cache server is not found in the first cache cluster.

4. The cooperative caching method of claim 1, wherein
in the (g), the request apportioning device instructs the fourth cache server to request the contents A from the third cache server so that the fourth cache server may cache the contents A.

5. The cooperative caching method of claim 1, wherein
in the (g), the request apportioning device allows the third cache server to provide the contents A to the fourth cache server so that the fourth cache server may cache the contents A.

6. A contents providing method using a request apportioning device for selecting a cache server for transmitting contents according to a plurality of source servers, a plurality of cache clusters having a plurality of cache servers, and a contents transmission request by a client, comprising:
(a) the request apportioning device checking a cache server (a first cache server hereinafter) having the first contents based on allocation history information for respective cache servers in a cache cluster (a first cache cluster hereinafter) according to a transmission request of first contents provided by the client;

(b) the request apportioning device checking a cache server (a second cache server hereinafter) that is less than an object service threshold load from among the first cache servers by using server load information;

(c) the request apportioning device allowing the first contents to be transmitted to the client from a cache server (a third cache server hereinafter) from among the second cache servers;

(d) the request apportioning device determining whether a number of times of the first contents transmission requests is greater than a predetermined value within a predetermined period;

(e) when a number of times of the first contents transmission requests is greater than a predetermined value within a predetermined period, the request apportioning device selecting a non-first cache server (a fourth cache server hereinafter) that is less than the object service threshold load in the first cache cluster, the fourth cache server not having the first contents;

(f) when a number of times of the first contents transmission requests is greater than a predetermined value within a predetermined period, the request apportioning device selecting a cache server (a fifth cache server hereinafter) that is less than a cooperative threshold load from among the first cache server, the fifth cache server having the first contents, the object service threshold load is less than the cooperative threshold load; and (g) the request apportioning device instructing a cooperative caching process between the fourth cache server and the fifth cache server to cache the first contents to the fourth cache server, the fourth cache server obtaining the first contents and providing the first contents to the client.

7. The contents providing method of claim 6, wherein
the fourth cache server selected in the (e) represents a non-first cache server that is less than the object service threshold load and has the lowest load level in the first cache cluster.

8. The contents providing method of claim 7, wherein
the fifth cache server selected in the (f) represents a cache server that is less than the cooperative threshold load and has the lowest load level from among the first cache servers.

9. The contents providing method of claim 6, wherein
in the (g), the request apportioning device instructs the fourth cache server to request the first contents from the fifth cache server so that the fourth cache server may cache the first contents.

10. The contents providing method of claim 6, wherein
in the (g), the request apportioning device allows the fifth cache server to provide the first contents to the fourth cache server so that the fourth cache server may cache the first contents.

11. A contents providing method using a request apportioning device for selecting a cache server for transmitting contents according to a plurality of source servers, a plurality of cache clusters having a plurality of cache servers, and a contents transmission request by a client, comprising:
(a) when first contents is requested by the client, the request apportioning device checking a load level for a cache server (a first cache server hereinafter) having first contents from among respective cache servers in a first cache cluster by using the allocation history information and the server load information;

(b) the request apportioning device determining whether there is a cache server that is less than the object service threshold load from among the first cache servers by using the threshold load management information;

(c) when the first cache server that is less than the object service threshold load is not found, the request apportioning device determining whether there is a cache server (a second cache server hereinafter) that is less than the cooperative threshold load from among the first cache servers, the object service threshold load is less than the cooperative threshold load;

(d) when the second cache server is provided, the request apportioning device selecting a cache server (a third cache server hereinafter) from among the second cache servers, the third cache server being greater than or equal to the object service threshold load and being less than the cooperative threshold load;

(e) the request apportioning device selecting a cache server (a fourth cache server hereinafter) that is less than the object service threshold load in the first cache cluster by using the allocation history information and the server load information, the fourth cache server not having the first contents;

(f) the request apportioning device instructing to perform a cooperative caching process for the contents A between the third cache server and the fourth cache server; and (g) the request apportioning device allowing the first contents to be transmitted to the client from the fourth cache server.

12. The contents providing method of claim 11, further comprising (h) the request apportioning device omitting the (d), performing the (e), and instructing the fourth cache server to cache the first contents from the source server having the first contents when the second cache server is not found according to the (c).

13. The contents providing method of claim 11, further comprising (i) the request apportioning device omitting the (a) to the (d), performing the (e), and instructing the fourth cache server to cache the first contents from the source server having the first contents when the first cache server is not found in the first cache cluster.

14. The contents providing method of claim 11, wherein in the (f), the request apportioning device instructs the fourth cache server to request the first contents from the third cache server so that the fourth cache server may cache the first contents.

15. The contents providing method of claim 11, wherein in the (f), the request apportioning device allows the third cache server to provide the first contents to the fourth cache server so that the fourth cache server may cache the first contents.

16. The contents providing method of claim 14, wherein the (g) includes:

the request apportioning device providing path information on the fourth cache server to which the first contents will be provided to the client; and the client accessing the fourth cache server according to the path information to request the first contents and receive the same therefrom.

17. The contents providing method of claim 14, wherein the (g) includes the request apportioning device receiving the first contents from the fourth cache server, and the request apportioning device providing the first contents to the client.

18. The contents providing method of claim 14, wherein the (g) includes the request apportioning device providing path information of the client to the fourth cache server, and the fourth cache server providing the first contents to the client according to the path information of the client.

19. The contents providing method of claim 14, wherein the (g) includes while the request apportioning device shares a same virtual IP with the fourth cache server and the virtual IP is set for a network interface between the request apportioning device and the fourth cache server, the request apportioning device requesting the fourth cache server to transmit the first contents, and the fourth cache server providing the first contents to the client.

* * * * *